United States Patent
Fleury et al.

(10) Patent No.: US 6,591,050 B2
(45) Date of Patent: Jul. 8, 2003

(54) FIBER FOR COMPENSATING CHROMATIC DISPERSION OF A MONOMODE FIBER IN BAND S

(75) Inventors: Ludovic Fleury, Bois d'Arcy (FR); Florent Beaumont, Conflans Ste Honorine (FR); Pierre Sillard, Le Chesnay (FR); Louis-Anne de Montmorillon, Paris (FR); Maxime Gorlier, Paris (FR); Pascale Nouchi, Maisons Laffite (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/974,904

(22) Filed: Oct. 12, 2001

(65) Prior Publication Data

US 2002/0067903 A1 Jun. 6, 2002

(30) Foreign Application Priority Data

Oct. 16, 2000 (FR) .............................. 00 13210

(51) Int. Cl.[7] ................................. G02B 6/02
(52) U.S. Cl. ...................... 385/123; 385/124
(58) Field of Search ............... 385/123, 124, 385/127, 126, 24; 359/126, 161, 173

(56) References Cited

U.S. PATENT DOCUMENTS 6,400,877 B1 * 6/2002 Kato et al. .................. 385/123

FOREIGN PATENT DOCUMENTS

| EP | 0 935 146 A2 | 8/1999 |
|---|---|---|
| EP | 0 938 018 A1 | 8/1999 |
| EP | 0 989 420 A1 | 3/2000 |
| EP | 1 030 199 A1 | 6/2000 |

OTHER PUBLICATIONS

J. Kani et al, "Novel 1470–NM–band WDM Transmission and its Application to Ultra–Wide–Band WDM Transmission", IEICE Transactions on Electronics Institute of Electronics Information and Comm. Eng., Tokyo, Japan, vol. E82–C, No. 8, Aug. 1999, pp. 1397–1405, XP000930695.

* cited by examiner

Primary Examiner—Phan T. H. Palmer
(74) Attorney, Agent, or Firm—Sughrue Mion, PLLC

(57) ABSTRACT

A chromatic dispersion-compensating fiber adapted to compensate the chromatic dispersion of a step index monomode fiber in band S presents chromatic dispersion of less than −40 ps/(nm.km) around 1475 nm, chromatic dispersion slope of less than −0.16 ps/(nm².km), and an effective area greater than or equal to 14 $\mu m^2$ around said wavelength value. The fiber is monomode at 1475 nm. The fiber can present a rectangle profile with a buried trench and a ring. It serves to compensate chromatic dispersion and chromatic dispersion slope for transmission systems in band S using a step index monomode fiber as the line fiber.

22 Claims, 1 Drawing Sheet

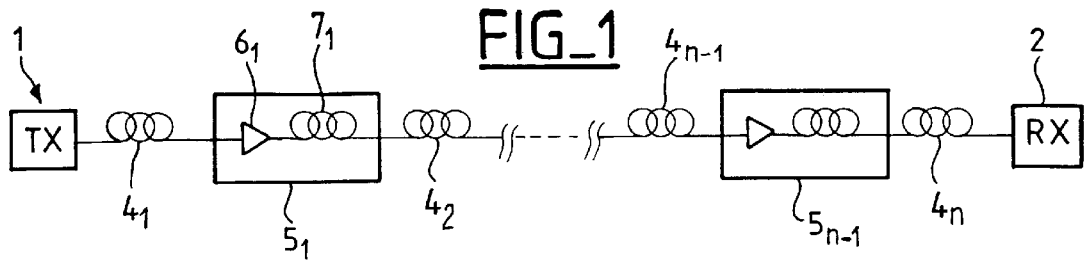
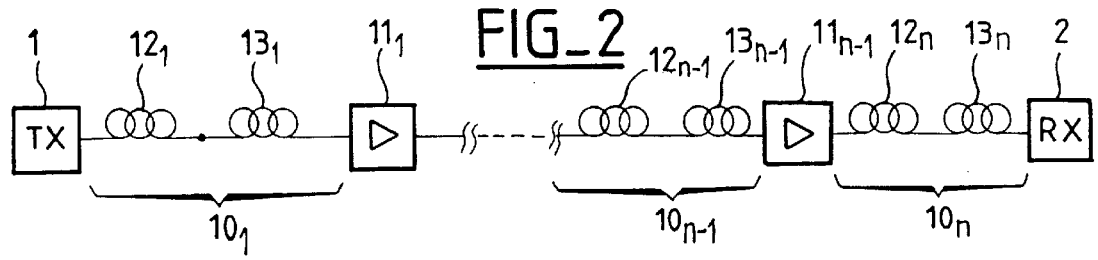
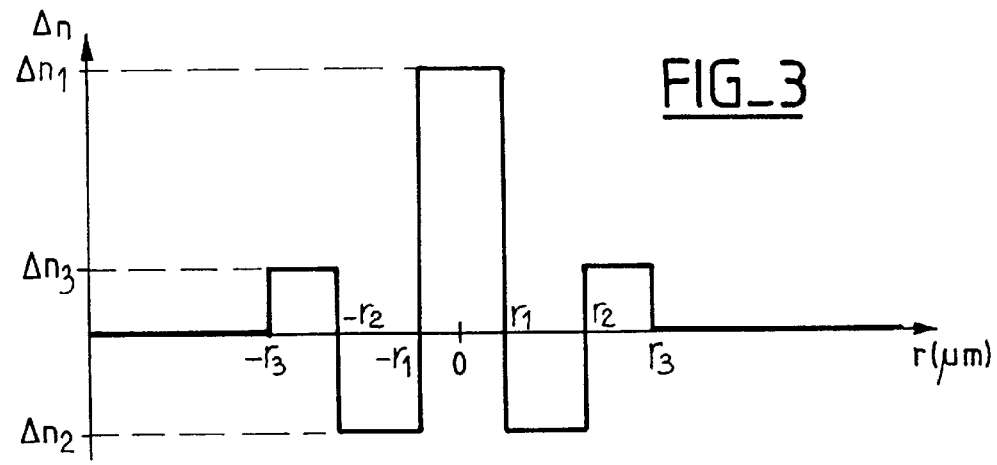
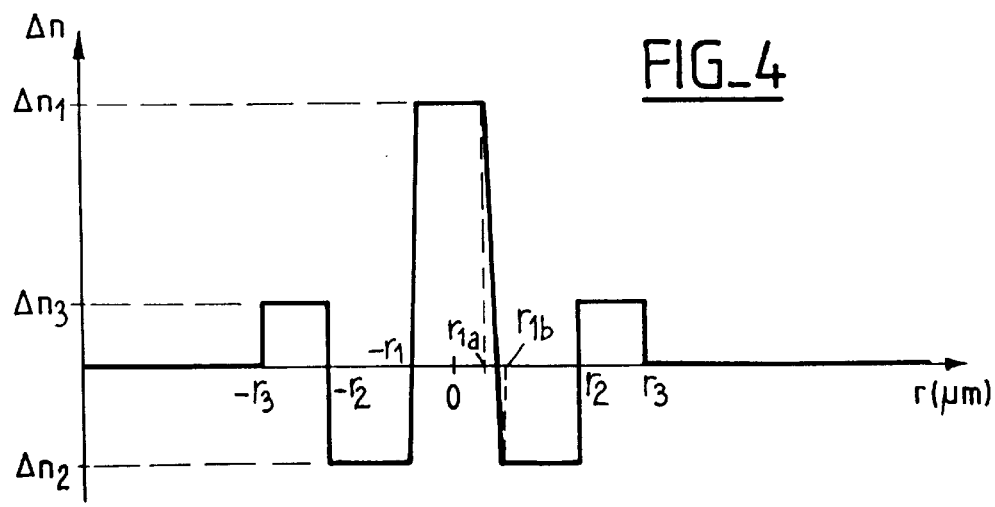

FIBER FOR COMPENSATING CHROMATIC DISPERSION OF A MONOMODE FIBER IN BAND S

The present invention relates to the field of optical fiber transmission, and more specifically it relates to compensating chromatic dispersion and chromatic dispersion slope in optical fiber transmission systems.

BACKGROUND OF THE INVENTION

The refractive index profile of an optical fiber is generally described in terms of the appearance of a graph plotting the refracting index to the fiber as a function of radius. The distance r from the center of the fiber is conventionally plotted along the abscissa, and the difference in refractive index relative to that of the cladding of the fiber is plotted up the ordinate. The term "step", "trapezium", and "triangle" are therefore used with respect to index profiles whose graphs are respectively step-shaped, trapezium-shaped, and triangular. These curves are generally representative of the ideal or theoretical profile for the fiber, and fiber manufacturing constraints can yield a profile that departs perceptibly therefrom.

In new high bit rate transmission networks that are in wavelength division multiplex (WDM), it is advantageous to manage chromatic dispersion, in particular for bit rates faster than or equal to 10 gibabits per second (Gbit/s); the idea that for all wavelength values of the multiplex chromatic compensation should accumulate to substantially zero over the link as a whole, so as to limit the extent to which pulses widen. Over an entire transmission system, it is acceptable for the cumulative value of dispersion to be a few hundreds of picoseconds per nanometer (ps/nm). It is also beneficial to avoid zero values for chromatic dispersion in the vicinity of the wavelengths actually used in the system since that makes them more subject to non-linear effects. Finally, it is also beneficial to limit the chromatic dispersion slope over the wavelength range of the multiplex so as to avoid or limit distortion between the channels of the multiplex. This problem of compensating chromatic dispersion and chromatic dispersion slope is particularly severe with very high bit rate transmission systems, typically for WDM transmission systems having per channel rates of 40 Gbit/s and above. The problem becomes more severe with bandwidth increasing up to values greater than or equal to 30 nanometers (nm) or even to 35 nm.

Conventionally, the line fibers used in optical fiber transmission systems are step-index fibers; these fibers are commonly referred to as single-mode fibers (SMFs). Thus, the Applicant markets a step index monomode fiber under the reference ASMF 200 which presents a chromatic dispersion cancellation wavelength xo lying in the range 1300 nm to 1320 nm, chromatic dispersion of 3.5 picoseconds per nanometer kilometer (ps/(nm.km)) in a range from 1285 nm to 1330 nm, and of 18 ps/(nm.km) at 1550 nm. Its chromatic dispersion slope at 1550 nm is about 0.06 picoseconds per square nanometer-kilometer ps/(nm².km). In known transmission systems, that fiber is used for transmitting signals with wavelengths close to 1550 nm (band C).

In that band, in order to compensate chromatic dispersion and chromatic dispersion slope in SMFs or in non-zero dispersion-shifted fibers (NZ-DSFs) used as line fibers, it is known to use short lengths of dispersion-compensating fiber (DCF). DCF has chromatic dispersion and chromatic dispersion slope of sign opposite to that of the chromatic dispersion and chromatic dispersion slope in the line fiber.

An example for an SMF line fiber is given by L. Gruner-Nielsen et al., in "Large volume manufacturing of dispersion-compensating fibers", OFC'98 Technical Digest TuD5.

EP-A-0 935 146 proposes dispersion-compensating fibers adapted to compensating chromatic dispersion and chromatic dispersion slope in SMFs, over a range of wavelengths around 1550 nm. Around that wavelength, such fibers present a ratio of chromatic dispersion over chromatic dispersion slope that is close to the ratio of chromatic dispersion over chromatic dispersion slope for the line fiber. That document proposes various fiber profiles; its FIG. 3 shows a fiber having a rectangle index profile with a buried trench and a ring.

OBJECTS AND SUMMARY OF THE INVENTION

Compared with that document, the present invention seeks to solve the novel problem of compensating chromatic dispersion in SMFs in band S. The term "band S" is used herein to mean the band which extends from 1450 nm to 1500 nm or from 1460 nm to 1490 nm, or around 1475 nm. Increasing interest is being shown in this band given the increase in the number of channels in terrestrial WDM systems. The invention proposes a solution adapted to high bit rate transmission over large bandwidths in existing transmission systems.

More precisely, the invention proposes an optical fiber that is monomode at 1475 nm and, at said wavelength, presents chromatic dispersion of less than −40 ps/(nm.km), a ratio of chromatic dispersion over chromatic dispersion slope less than 250 nm, and an effective section area greater than or equal to 14 $\mu m^2$.

Advantageously, it presents an effective area greater than 13 $\mu m^2$ at 1450 nm. It can also present, at 1475 nm, chromatic dispersion greater than or equal to −150 ps/(nm.km).

In an embodiment, the fiber presents, at 1475 nm, chromatic dispersion less than or equal to −60 ps/(nm.km). The fiber can also present, at a wavelength of 1475 nm, a ratio of chromatic dispersion over chromatic dispersion slope lying in the range 170 nm to 230 nm.

In another embodiment and at a wavelength of 1500 nm, the fiber presents bending losses less than $10^{-3}$ dB for a coil of 100 turns of fiber on a radius of 30 mm. It can also present bending losses less than 100 dB/m at a wavelength of 1500 nm for a loop of fiber having a radius of 10 mm.

Preferably, the fiber presents, for a wavelength of 1475 nm, attenuation less than 1.2 dB/km. In yet another embodiment, the fiber presents, for a wavelength of 1475 nm, a mode diameter greater than 4 $\mu m$. It can also present, for a wavelength of 1475 nm, sensitivity to microbending less than 1, and preferably less than or equal to 0.5.

It is also advantageous for the fiber to present a theoretical cutoff wavelength longer than 1100 nm, and shorter than 1800 nm, preferably shorter than 1700 nm, or even shorter than 1600 nm.

Concerning its profile, the fiber can present a rectangle index profile with a depressed trench and a ring, or a trapezium index profile with a depressed trench and a ring.

In an embodiment, the difference between the index of the rectangle or of the ring and the index of the cladding lies in the range $16 \times 10^{-3}$ to $25 \times 10^{-3}$, and the radius of the portion of the fiber presenting an index greater than or equal to that of the cladding lies in the range 1.3 $\mu m$ to 2.3 $\mu m$.

In another embodiment, the difference between the index of the depressed trench and the index of the cladding lies in the range $-9 \times 10^{-3}$ to $-5 \times 10^{-3}$, and the outside radius of the trench lies in the range 3.7 µm to 6 µm.

In yet another embodiment, the difference between the index of the ring and the index of the cladding lies in the range $3 \times 10^{-3}$ and $11 \times 10^{-3}$, and the outside radius of the ring lies in the range 6.6 µm to 8.3 µm.

Preferably, twice the integral of the product of the radius multiplied by the index between radius zero and the outside radius of the central portion of the fiber presenting an index greater than that of the cladding lies in the range $30 \times 10^{-3}$ µm$^2$ to $60 \times 10^{-3}$ µm$^2$.

It is also possible to provide for the product of the square of the outside radius of the depressed trench multiplied by the index of the depressed trench to lie in the range $-300 \times 10^{-3}$ µm$^2$ to $-110 \times 10^{-3}$ µm$^2$.

It is also possible for the product of the thickness of the ring multiplied by the index of the ring to lie in the range $7 \times 10^{-3}$ µm and $14.5 \times 10^{-3}$ µm.

The invention also proposes a transmission system in which the line fiber comprises a step index monomode fiber which is dispersion-compensated in band S. It is advantageous for the cumulative chromatic dispersion for each channel in the range 1460 nm to 1490 nm to have an absolute value of less than 100 picoseconds per nanometer (ps/nm) on average for transmission over a distance of over 100 kilometers (km).

The line fiber can be constituted by a step index monomode fiber or by a step index monomode fiber and a dispersion-compensating fiber. The above-mentioned fiber is particularly advantageous for use in such a transmission system as the dispersion-compensating fiber.

Finally, the present invention proposes a dispersion-compensating module comprising an amplifier and a segment of such a fiber.

BRIEF DESCRIPTION OF THE DRAWINGS

Other characteristics and advantages of the invention will appear on reading the following description of embodiments of the invention, given by way of example and with reference to the accompanying drawing, in which:

FIGS. 1 and 2 are diagrams of embodiments of a transmission system of the invention; and FIGS. 3 and 4 show examples of index profiles in fibers of the invention.

MORE DETAILED DESCRIPTION

The invention proposes a chromatic dispersion-compensating fiber suitable for compensating the chromatic dispersion of a step index monomode fiber in band S. The fiber is monomode at 1475 nm. It has chromatic dispersion of less than −40 ps/(nm.km) around 1475 nm, a chromatic dispersion slope less than −0.16 ps/(nm$^2$.km), and an effective section area greater than or equal to 14 µm$^2$ around said wavelength value. It is also possible to provide for the ratio of the chromatic dispersion over the chromatic dispersion slope to present the value of less than 250 nm around said wavelength of 1475 nm, this ensures that the cumulative dispersion in each channel in the range 1450 nm to 1500 nm has an absolute value of less than 70 ps/nm, on average for transmission over 100 km when the fiber is used as a compensation fiber for an SMF.

The fiber of the invention makes it possible to compensate chromatic dispersion and chromatic dispersion slope for transmission systems in band S that use a conventional step index monomode fiber as the line fiber. As mentioned above, around 1550 nm, an SMF typically presents chromatic dispersion of 15 ps/(nm.km) to 20 ps/(nm.km) and a chromatic dispersion slope of around 0.06 ps/(nm$^2$.km). In band S, at a wavelength of 1475 nm, the SMF presents chromatic dispersion of about 13 ps/(nm.km) and a chromatic dispersion slope of about 0.064 ps/(nm$^2$.km). The ratio of chromatic dispersion over chromatic dispersion slope is about 200 nm. At this wavelength, the prior art compensation fiber, as described in EP-A-0 935 146, for example, is unsuitable for compensating chromatic dispersion and chromatic dispersion slope; typically the ratio of chromatic dispersion over chromatic dispersion slope in the prior art fiber is greater than 250 nm or indeed 300 nm. Even if that dispersion-compensating fiber were to be used in band S for transmission systems using an SMF line fiber, it could achieve only partial compensation of chromatic dispersion and chromatic dispersion slope. For example, with a ratio of 300 nm, the absolute value of the cumulative dispersion over a transmission distance of 100 km would exceed 100 ps/nm for channels centered in the range 1450 nm to 1500 nm.

The invention also provides optical fiber transmission systems in which the line fiber is an SMF, i.e. a fiber presenting, at 1550 nm, chromatic dispersion in the range 15 ps/(nm.km) to 20 ps/(nm.km) and a chromatic dispersion slope in the range 0.055 ps/(nm$^2$.km) to 0.060 ps/(nm$^2$.km). Such a line fiber can also be characterized by chromatic dispersion values and chromatic dispersion slope values around 1475 nm, as mentioned above.

FIG. 1 is a diagram of a first embodiment of a transmission system of the invention. The figure shows a transmitter TX 1 and a receiver RX 2. These two elements are interconnected by a plurality of line fiber segments $4_1$ to $4_n$. The term "line fiber" is used to mean the fiber extending along the transmission system and whose length corresponds substantially to the transmission distance of the system. In the embodiment of FIG. 1, the line fiber is constituted by an SMF. Dispersion-compensating repeater modules $5_1$ to $5_{n-1}$ are disposed between the segments. A dispersion-compensating module $5_i$ comprises an amplifier $6_i$, followed by a segment of dispersion-compensating fiber $7_i$. The figure does not show the filters and other elements that have no direct bearing on the operation of the invention.

The light coming from the SMF is amplified, after which it passes through the dispersion-compensating fiber segment where chromatic dispersion and chromatic dispersion slope are compensated. It would also be possible to interchange the respective positions of the dispersion-compensating fiber and the amplifier within the compensation module.

FIG. 2 shows another embodiment of a transmission system of the invention. In the embodiment of FIG. 2, the dispersion-compensating fiber is also used as a line fiber. This figure has the same transmitter TX 1 and receiver RX 2. These two elements are interconnected by a plurality of line fibers segments $10_i$ interconnected by repeaters $11_i$. Each repeater comprises amplifiers, filters, and other conventional elements, and is not described in greater detail. Each line fiber segment $10_i$ includes both a segment $12_i$ of SMF, and also a segment $13_i$ of dispersion-compensating fiber of the invention.

The embodiments of FIGS. 1 and 2 constitute two extremes: in the embodiment of FIG. 1, the line fiber is constituted solely by SMF, and all of the dispersion-compensating fiber is located in discrete modules. Under such circumstances, the dispersion-compensating fiber does not contribute in any way to the length of the transmission system. This embodiment is particularly suitable for presently-existing SMF connections, which can thus be modified to enable them to transmit in band S. Conversely, in the embodiment of FIG. 2, the dispersion-compensating fiber also serves as line fiber, and the repeaters do not contain any dispersion-compensating fiber. Solutions intermediate between the solution of FIG. 1 and that of FIG. 2 are also possible.

In both cases, the respective length LDCF and LF of the dispersion-compensating fiber and of the line fiber referenced F are ideally selected in such a manner that:

$$L_{DCF} \times C_{DCF} = -L_F \times C_F \tag{1}$$

where $C_{DCF}$ is the chromatic dispersion of the dispersion-compensating fiber at 1475 nm, and $C_F$ is the chromatic dispersion of the line fiber at 1475 nm. This relationship ensures that the cumulative chromatic dispersion in the line fiber is compensated in the dispersion-compensating fiber. This constraint can be relaxed so that cumulative dispersion of no more than 10 ps/nm at 1475 nm is accepted after transmission over a distance of 100 km. Chromatic dispersion is selected to be highly negative so as to make it possible to use as short a length of compensation fiber as possible.

By way of example, consideration can be given to a transmission system of the kind shown in FIG. 1, having segments of SMF line fiber with a length $L_{SMF}$ of 100 km, and segments of compensating fiber of length $L_{DCF}$ that are 20 km long in the repeater modules. At 1475 nm, the SMF presents chromatic dispersion of about 13 ps/(nm.km) and chromatic dispersion slope of 0.064 ps/(nm².km); the DCF is of the kind described with reference to FIG. 3, with, at a wavelength of 1475 nm, chromatic dispersion of −65 ps/(nm.km) and chromatic dispersion slope of −0.33 ps/(nm².km). Under such circumstances, the cumulative chromatic dispersion at 1475 nm is close to 0 ps/nm. For a WDM signal in the range 1450 nm to 1500 nm, the cumulative chromatic dispersion is less than 20 ps/nm in each channel for each 100 km constituting a segment of the transmission system. This serves to limit cumulative chromatic dispersion to values of less than a few tens of ps/nm, as stated above. On average, for 100 km of transmission on each channel in band S, cumulative chromatic dispersion is limited to less than 20 ps/nm.

Compensating dispersion slope simultaneously with compensating chromatic dispersion depends on the ratio of chromatic dispersion over chromatic dispersion slope in the SMF and in the dispersion-compensating fiber. With the ratio in the SMF and the ratio in the DCF being written respectively $R_{SMF}$ and $R_{DCF}$, then ideally $R_{SMF} = R_{DCF}$ at the wavelength of 1475 nm, thus ensuring that the chromatic dispersion slope is properly compensated around 1475 nm providing the cumulative chromatic dispersion is itself well compensated at 1475 nm, being less than 10 ps/nm at this wavelength.

By keeping a ratio $R_{DCF}$ less than 250 nm, it is ensured that the cumulative chromatic dispersion over 100 km of transmission remains less than 50 ps/nm for each channel in the range 1460 nm to 1490 nm of a multiplex having a bandwidth of 30 nm centered on the wavelength of 1475 nm. By increasing the working range to 1450 nm to 1500 nm, the absolute value of the cumulative dispersion remains less than 70 ps/nm, which maximum value is reached for a ratio $R_{DCF}$ equal to 250 nm.

For a ratio $R_{DCF}$ of less than 250 nm, the absolute value of the cumulative chromatic dispersion increases on average for all of the channels of a multiplex centered around the wavelength of 1475 nm. The invention thus proposes that the fiber present a ratio of chromatic dispersion over chromatic dispersion slope which remains less than 250 nm so as to minimize the absolute value of the mean cumulative chromatic dispersion in the range 1450 nm to 1500 nm for a given transmission distance.

There follows a description of the characteristics of the dispersion-compensating fiber of the invention, prior to describing a way of making it. At a wavelength of 1475 nm, the fiber presents negative chromatic dispersion and negative chromatic dispersion slope, thus enabling it to compensate the chromatic dispersion and the chromatic dispersion slope of the SMF. Its chromatic dispersion is less than −40 ps/(nm.km), and lies for example in the range −150 ps/(nm.km) to −40 ps/(nm.km). The fiber presents chromatic dispersion slope lying in the range −0.5 ps/(nm².km) to −0.16 ps/(nm².km). Alternatively, provision can be made for the ratio of chromatic dispersion of the chromatic dispersion slope to be close to 200 nm, which is very close to the value of the ratio of chromatic dispersion over chromatic dispersion slope of the SMF. At 1475 nm, it is advantageous for the ratio to lie in the range 170 nm to 230 nm. In addition, the fiber is monomode at 1475 nm.

As mentioned above, it is advantageous for the fiber to present low bending losses. Such bending losses are conventionally evaluated by measuring the losses caused by winding the fiber. By way of example, 100 turns of the fiber can be wound around a former having a radius of 30 mm, and the loss induced by the winding can be measured; it is also possible merely to form a loop of fiber around a former having a radius of 10 mm, and to measure linear losses. In either case, bending losses are an increasing function of wavelength, and the behavior of the fiber at 1475 nm is always better than its behavior at 1500 nm; thus, in order to guarantee proper operation in band S, it suffices to determine the characteristics of the fiber around 1500 nm. The fiber of the invention preferably presents bending losses at 1500 nm as measured for 100 turns of fiber wound on a radius of 30 mm that are less than $10^{-3}$ dB. This limit for bending losses ensures that the dispersion-compensation fiber can be coiled in a repeater, as in the embodiment of FIG. 1, or that it can accept being included in a cable, as in the embodiment of FIG. 2. It is also possible to ensure that bending losses as measured in a fiber loop having a radius of 10 mm are less than 100 dB/m at 1500 nm.

It is advantageous for the fiber also to present one or more of the following characteristics:

chromatic dispersion less than −60 ps/(nm.km) at 1475 nm;

cutoff wavelength measured over 2 m, less than 1450 nm;

effective cutoff wavelength in a cable, less than 1300 nm;

theoretical cutoff wavelength longer than 1100 nm and shorter than 1800 nm, or 1700 nm, or indeed 1600 nm;

effective area greater than 14 $\mu m^2$, preferably greater than 13 $\mu m^2$ at 1450 nm;

sensitivity to microbending less than 1, and preferably less than or equal to 0.5; and mode diameter greater than 4 $\mu m$ at a wavelength longer than 1450 nm.

The value proposed for chromatic dispersion serves to limit the length of dispersion-compensation fiber used in the system. By increasing the theoretical cutoff wavelength to longer than 1100 nm, it is possible to find a better compromise over propagation characteristics. With a theoretical cutoff wavelength shorter than 1600 nm, it is ensured that the fiber is always monomode in band S, for most index profiles. With a theoretical cutoff wavelength longer than 1600 nm, it is possible that certain fiber profiles are no longer monomode in band S. With an effective cutoff wavelength as defined by standard ITU-T G650 shorter than 1450 nm, it is guaranteed that the compensation fiber acts as a monomode fiber in band S. The effective area value limits the non-linear effects that can appear when the power of the signal propagating in the compensation fiber is high, in particular in the FIG. 1 embodiment of a transmission system of the invention. An effective area greater than 14 $\mu m^2$ at 1475 nm makes it possible to limit non-linear effects over all of band S. The sensitivity of the fiber to microbending is evaluated in a relative manner, as compared with the fiber marketed by the Applicant under referenced AMSF 200; it is possible to use the method of flattening the fiber between two grids, which method is known per se.

FIG. 3 is a diagram showing the ideal index profile for a fiber of the invention; in this embodiment, the index profile is an index profile of the rectangle type, together with a buried trench and a ring, and starting from the center of the fiber it presents:
- a central portion of substantially constant index greater than or equal to the cladding index; and
- an annular portion of index lower than or equal to the cladding index;

the profile as a whole constituting a profile referred to as being "rectangular with a buried or depressed trench".

Around its buried trench, the fiber of FIG. 3 presents a ring, i.e. a portion of index greater than the cladding index, whence the term "rectangle profile with a buried trench and a ring".

The values for the indices and radii in the embodiment of FIG. 3 are as follows. The central rectangle has a radius $r_1$ of 1.66 $\mu m$, and its index presents a difference $\Delta n_1$ of $18.4 \times 10^{-3}$ relative to the index of the cladding.

The buried trench extends between radii $r_1$ and $r_2$, with $r_2=4.68$ $\mu m$, and its index presents a difference $\Delta n_2$ of $-7.0 \times 10^{-3}$ relative to the index of the cladding.

Around the trench there extends the ring, between radii $r_2$ and $r_3$ with $r_3=7.2$ $\mu m$; the ring presents an index difference $\Delta n_3$ of $4.1 \times 10^{-3}$ relative to the index of the cladding.

Around the ring there extends the cladding of the fiber, and it is relative to the index of the cladding that index differences are measured.

These values make it possible to obtain a fiber presenting the following characteristics:
- theoretical cutoff wavelength $\lambda_{cth}$: 1600 nm;
- effective area at 1475 nm: 17 $\mu m^2$;
- chromatic dispersion at 1475 nm: $-65$ ps/(nm.km);
- chromatic dispersion slope at 1475 nm: $-0.33$ ps/(nm$^2$.km);
- ratio of chromatic dispersion over chromatic dispersion slope: 197 nm;
- diameter of $2W_{02}$ mode at 1475 nm: 4.63 $\mu m$;
- bending losses at 1475 nm and at 1500 nm, for 100 turns of a coil having a radius of 30 mm, less than $10^{-3}$ dB; and
- sensitivity to microbending at 1475 nm: 0.2.

The cutoff wavelength given here is the theoretical cutoff wavelength; in practice, the cutoff wavelength as measured on a cable is several hundreds of nm shorter; it will be understood that the fiber is effectively monomode in the wavelength range of the working signals, e.g. 1460 nm to 1490 nm.

In another embodiment, the fiber has the same profile, but with the following values for its indices and radii:

| $r_1$ ($\mu m$) | $r_2$ ($\mu m$) | $r_3$ ($\mu m$) | $10^3 \cdot \Delta n_1$ | $10^3 \cdot \Delta n_2$ | $10^3 \cdot \Delta n_3$ |
|---|---|---|---|---|---|
| 1.45 | 4.39 | 7.174 | 22.2 | $-6.9$ | 4.6 |

These values make it possible to obtain the following propagation characteristics:

| $\lambda_{cth}$ (nm) | Aeff ($\mu m^2$) | C (ps/nm/km) | $dC/d\lambda$ (ps/nm$^2$/km) | C/(dC/d$\lambda$) (nm) | $2W_{02}$ ($\mu m$) |
|---|---|---|---|---|---|
| 1629 | 15.1 | $-101.8$ | $-0.51$ | 201 | 4.56 |

FIG. 4 shows another profile for a fiber of the invention. In this embodiment, the fiber has a trapezium profile with a buried trench and a ring. In other words, starting from the center of the fiber, there are to be found:
- a central portion of substantially constant index greater than or equal to the index of the cladding; and
- an annular portion of index less than or equal to the index of the cladding;

these two portions being spaced apart by an annular portion in which the index decreases in substantially linear manner. Overall this constitutes an index profile which is preferred to as a "trapezium with a buried or depressed trench".

As in the embodiment of FIG. 3, this buried trench is surrounded by a ring.

By analogy with the embodiment of FIG. 3, the following can be observed in FIG. 4:

- $r_{1a}$ is the radius of the small base of the trapezium, i.e. the radius of the central portion which is of substantially constant index;
- $r_{1b}$ is the radius of the large base of the trapezium, i.e. the radius at the inside of the depressed trench;
- $r_1$ is the radius of the trapezium at which its index is equal to the index of the cladding;
- $r_2$ is the outside radius of the depressed trench; and
- $r_3$ is the outside radius of the ring.

The indices and the radii can then have the following values:

| $r_{1a}/r_{1b}$ | $r_1$ ($\mu m$) | $r_2$ ($\mu m$) | $r_3$ ($\mu m$) | $10^3 \cdot \Delta n_1$ | $10^3 \cdot \Delta n_2$ | $10^3 \cdot \Delta n_3$ |
|---|---|---|---|---|---|---|
| 0.73 | 1.97 | 5.25 | 7.71 | 18 | $-5.9$ | 5.15 |

Under such circumstances, a fiber is obtained which presents the following propagation characteristics:

| $\lambda_{cth}$ (nm) | Aeff ($\mu m^2$) | C (ps/nm/km) | $dC/d\lambda$ (ps/nm$^2$/km) | C/(dC/d$\lambda$) (nm) | $2W_{02}$ ($\mu m$) |
|---|---|---|---|---|---|
| 1698 | 17.6 | $-53$ | $-0.256$ | 207 | 4.73 |

In general, the profile of the fiber can thus be qualified as follows. Firstly, the profile is a trapezium or a rectangle profile associated with a buried or depressed trench and a ring. The central portion presents an index difference relative to the cladding which satisfies:

$$16 \times 10^{-3} \leq \Delta n_1 \leq 25 \times 10^{-3}$$

As mentioned above, it is recalled that $r_1$ is the radius of the radius of the portion whose index is greater than that of the cladding, with index remaining constant at radius values smaller than $r_1$ for a rectangle profile but not for a trapezium profile. Under such circumstances, it is advantageous for the radius $r_1$, expressed in micrometers, to satisfy the following:

$$1.3 \, \mu m \leq r_1 \leq 2.3 \, \mu m$$

For the buried trench, it is possible to select values for the index difference $\Delta n_2$ and for the outside radius $r_2$ that satisfy the following:

$$-9.5 \times 10^{-3} \leq \Delta n_2 \leq -5 \times 10^{-3}$$

and $$3.7 \, \mu m \leq r_2 \leq 6 \, \mu m$$

For the ring, it is possible to choose values for the index difference $\Delta n_3$ and for the outside radius $r_3$ that satisfy the following:

$$3 \times 10^{-3} \leq \Delta n_3 \leq 11 \times 10^{-3}$$

and $$6.6 \, \mu m \leq r_3 \leq 8.3 \, \mu m$$

The fiber can have other characteristics. For example, it is possible to use the parameter S defined as follows:

$$S = 2 \cdot \int_0^{r_1} \Delta n(r) \cdot r \cdot dr$$

This parameter is equivalent to multiplying an area by an index. This parameter is simple to apply both to the trapezium profile and to the rectangle profile, and it represents the increase of index in the vicinity of the core of the fiber. It preferably satisfies the following:

$$30 \times 10^{-3} \, \mu m^2 \leq S \leq 60 \times 10^{-3} \, \mu m^2$$

To characterize the buried trench, it is possible to use as a parameter the product of the square of the outside radius multiplied by the index. This parameter is critical for fibers of the invention even though it is not possible to provide a simple physical explanation for this parameter. It is advantageous for:

$$-300 \times 10^{-3} \, \mu m^2 \leq S \leq 60 \times 10^{-3} \, \mu m^2$$

For the ring, it is possible to use a parameter of the same kind as that for the central portion, i.e. the product of the width of the ring multiplied by the index difference. Under such differences, it is advantageous for:

$$7 \times 10^{-3} \, \mu m \leq (r_3 - r_2) \Delta n_3 \leq 14.5 \times 10^{-3} \, \mu m$$

The fiber of the invention can be manufactured by the person skilled in the art using conventional techniques such as modified chemical vapor deposition (MCVD), outside vapor deposition (OVD), or other techniques commonly used for manufacturing optical fibers.

Naturally, the present invention is not limited to the embodiments and implementations described and shown, and it can be varied in numerous ways by the person skilled in the art. The fiber of the invention can be used in systems other than those shown in FIGS. 1 and 2. In particular, it is possible to use a transmission system of the kind shown in FIG. 1, with a demultiplexer to separate signals in bands S, C, and L. Under such circumstances, the compensation fiber of the invention can be used to compensate chromatic dispersion in band S, and other dispersion-compensating fibers can be used to compensate dispersion in band C and/or in band L. In the configuration of FIG. 1, it is also possible to include an amplifier after the dispersion-compensating fiber, giving a configuration: amplifier+DCF+amplifier, i.e. amplification in two stages.

It is also possible to obtain a fiber of the invention using a profile other than the profiles shown in FIGS. 3 and 4.

What is claimed is:

1. An optical fiber that is monomode at a wavelength of 1475 nm and, at said wavelength, presents chromatic dispersion of less than −40 ps/(nm.km), a ratio of chromatic dispersion over chromatic dispersion slope less than 250 nm, and an effective area greater than or equal to 14 $\mu m^2$.

2. The fiber of claim 1, presenting a rectangle index profile with a depressed trench and a ring.

3. The fiber of claim 2 wherein the product of the thickness of the ring multiplied by the index of the ring lies in the range $7 \times 10^{-3}$ $\mu m$ and $14.5 \times 10^{-3}$ $\mu m$.

4. The fiber of claim 2, wherein the difference between the index of the rectangle or of the ring and the index of the cladding lies in the range $16 \times 10^{-3}$ to $25 \times 10^{-3}$, and wherein the radius of the portion of the fiber presenting an index greater than or equal to that of the cladding lies in the range 1.3 $\mu m$ to 2.3 $\mu m$.

5. The fiber of claim 2, wherein the difference between the index of the depressed trench and the index of the cladding lies in the range $-9 \times 10^{-3}$ to $-5 \times 10^{-3}$, and wherein the outside radius of the trench lies in the range 3.7 $\mu m$ to 6 $\mu m$.

6. The fiber of claim 2, wherein the difference between the index of the ring and the index of the cladding lies in the range $3 \times 10^{-3}$ and $11 \times 10^{-3}$, and wherein the outside radius of the ring lies in the range 6.6 $\mu m$ to 8.3 $\mu m$.

7. The fiber of claim 2, wherein twice the integral of the product of the radius multiplied by the index between radius zero and the outside radius of the central portion of the fiber presenting an index greater than that of the cladding lies in the range $30 \times 10^{-3}$ $\mu m2$ to $60 \times 10^{-3}$ $\mu m2$.

8. The fiber of claim 2, wherein the product of the square of the outside radius of the depressed trench multiplied by the index of the depressed trench lies in the range $300 \times 10^{-3}$ $\mu m2$ to $-110 \times 10^{-3}$ $\mu m2$.

9. A transmission system in which the line fiber comprises a step index monomode fiber that is dispersion-compensated in band S by a fiber in accordance with claim 1.

10. The system of claim 9, wherein the cumulative chromatic dispersion in each channel in the range 1460 nm to 1490 nm has an absolute value less than 100 ps/nm on average for transmission over a distance of 100 km.

11. The fiber of claim 1, presenting a theoretical cutoff wavelength longer than 1100 nm, and shorter than 1800 nm, preferably shorter than 1700 nm, or even shorter than 1600 nm.

12. The fiber of claim 1, presenting, for a wavelength of 1475 nm, sensitivity to microbending less than 1, and preferably less than or equal to 0.5.

13. The fiber of claim 1, presenting a trapezium index profile with a depressed trench and a ring.

14. The fiber of claim 1, presenting an effective area greater than 13 $\mu m^2$ at 1450 nm.

15. The fiber of claim 1, presenting, at 1475 nm, chromatic dispersion greater than or equal to −150 ps/(nm.km).

16. The fiber of claim 1, presenting, at 1475 nm, chromatic dispersion less than or equal to −60 ps/(nm.km).

17. The fiber of claim 1, presenting, at a wavelength of 1475 nm, a ratio of chromatic dispersion over chromatic dispersion slope lying in the range 170 nm to 230 nm.

18. The fiber of claim 1, presenting bending losses less than $10^{-3}$ dB for a winding of 100 turns of fiber on a radius of 30 mm, at a wavelength of 1500 nm.

19. The fiber of claim 1, presenting bending losses less than 100 dB/m at a wavelength of 1500 nm for a loop of fiber having a radius of 10 mm.

20. The fiber of claim 1, presenting, for a wavelength of 1475 nm, attenuation less than 1.2 dB/km.

21. The fiber of claim 1, presenting, for a wavelength of 1475 nm, a mode diameter greater than 4 µm.

22. A dispersion-compensating module comprising an amplifier and a segment of fiber according to claim 1.

* * * * *